US010310133B2

(12) United States Patent
Craft et al.

(10) Patent No.: US 10,310,133 B2
(45) Date of Patent: Jun. 4, 2019

(54) CALIBRATION OF GEOPHONE AND HYDROPHONE PAIRS

(71) Applicant: Fairfield Industries Incorporated, Sugar Land, TX (US)

(72) Inventors: Kenneth Lawrence Craft, Missouri City, TX (US); Carsten Udengaard, Sugar Land, TX (US)

(73) Assignee: Fairfield Geotechnologies, Houston, TX (US)

( * ) Notice: Subject to any disclaimer, the term of this patent is extended or adjusted under 35 U.S.C. 154(b) by 199 days.

(21) Appl. No.: 15/285,208

(22) Filed: Oct. 4, 2016

(65) Prior Publication Data
US 2018/0095189 A1 Apr. 5, 2018

(51) Int. Cl.
G01V 1/38 (2006.01)
G01V 13/00 (2006.01)
G01V 1/18 (2006.01)
G01V 1/36 (2006.01)

(52) U.S. Cl.
CPC .............. *G01V 13/00* (2013.01); *G01V 1/181* (2013.01); *G01V 1/186* (2013.01); *G01V 1/364* (2013.01); *G01V 1/3808* (2013.01); *G01V 1/3852* (2013.01); *G01V 2210/1427* (2013.01)

(58) Field of Classification Search
None
See application file for complete search history.

(56) References Cited

U.S. PATENT DOCUMENTS

| 7,630,276 B2 | 12/2009 | Paffenholz |
| 7,953,556 B2 | 5/2011 | Craft et al. |
| 2008/0221801 A1 | 9/2008 | Craft et al. |
| 2009/0238036 A1 | 9/2009 | Robertsson et al. |

OTHER PUBLICATIONS

Fairfieldnodal, Seismic Processing & Imaging, 3 pages, 2016.
Aslaug S Melbo et al: "PZ calibration using critically refracted waves", EAGE 64th Conference & Exhibition, May 27, 2002 (May 27, 2002), pp. 27-30 XP055415053, Par Data example, 1. 6-7.
Remco Muijs et al.: "Data-driven adaptive decomposition of multicomponent seabed recordings", Geophysics vol. 69, No. 5, Sep. 1, 2004 (Sep. 1, 2004), pp. 1329-1337, XP055415271 US, ISSN: 0016-8033, DOI: 10.1190/1.1801949.
International Search Report and Written Opinion of the International Searching Authority for Application No. PCT/US2017/044669 dated Oct. 26, 2017.

*Primary Examiner* — Hovhannes Baghdasaryan
(74) *Attorney, Agent, or Firm* — Foley & Lardner LLP; James De Vellis

(57) ABSTRACT

A system to improve calibration of geophone and hydrophone pairs is described. The system generates first and second phase shifted data by applying a first and second phase shift to first seismic data acquired by the geophone. The system generates a first upgoing wavefield by summing the first phase shifted data and second seismic data acquired by the hydrophone, and a second upgoing wavefield by summing the second phase shifted data and the second seismic data. The system generates a first downgoing wavefield from a difference of the first phase shifted data and the second seismic data, and a second downgoing wavefield from a difference of the second phase shifted data and the second seismic data. The system determines ratios of the upgoing wavefields and the downgoing wavefields for each phase shift to identify the highest ratio, and selects the phase shift corresponding to the highest ratio for calibration.

20 Claims, 6 Drawing Sheets

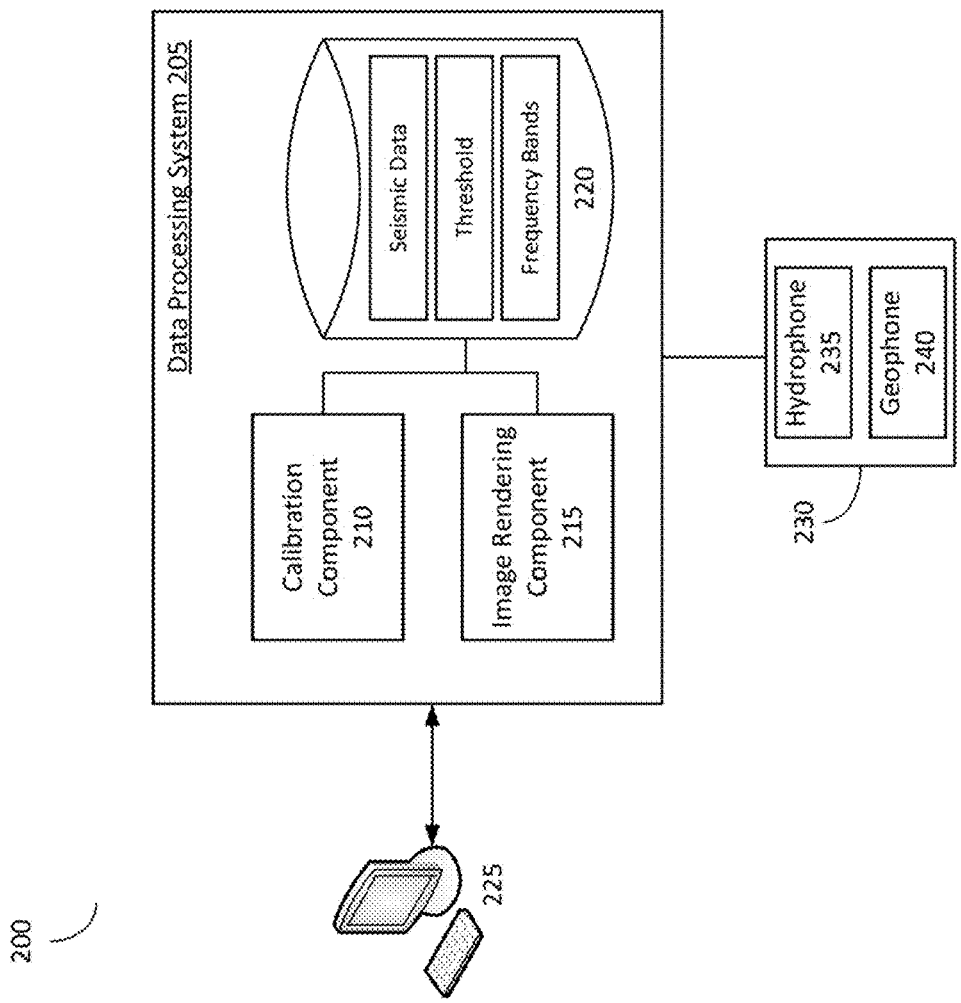

CALIBRATION OF GEOPHONE AND HYDROPHONE PAIRS

FIELD OF THE DISCLOSURE

Embodiments described herein relate to the field of seismic exploration in a marine environment and to systems and methods of performing a seismic survey to compensate for a coupling of a geophone in a dual sensor or multi-component configuration.

BACKGROUND

Seismic data may be evaluated to obtain information about subsurface features. The information can indicate geological profiles of a subsurface portion of earth, such as salt domes, bedrock, or stratigraphic traps, and can be interpreted to indicate a possible presence or absence of minerals, hydrocarbons, metals, or other elements or deposits.

SUMMARY OF THE DISCLOSURE

Embodiments described herein relate to systems and methods of performing a seismic survey in a marine environment. The systems and methods can improve the calibration of data acquired by geophone and hydrophone pairs used in seismic exploration in a marine environment. The present disclosure can compensate for a different degree of coupling of a geophone to a seabed relative to a degree of coupling of a hydrophone to water in order to remove artifacts in the data due to varying degrees of coupling, thereby calibrating the data acquired by the geophone to the data acquired by the hydrophone.

Seismic exploration in deep water can utilize seismic sensor devices, such as geophones and hydrophones, stored on a marine vessel that are transferred from the vessel and placed on or near the seafloor or seabed. When at least one receiver line consisting of a suitable number of the OBS units is formed, a seismic survey may be performed by providing a source signal, such as an acoustic or vibrational signal. Reflected signals from the seabed and underlying structures are recorded by one or more geophones or hydrophones on the one or more OBS units.

A data processing system can use the recorded data to generate an image, graph, plotted data, or perform other analysis. For example, the recorded data can include first seismic data acquired from a vertical geophone and second seismic data acquired from a hydrophone. The data processing system can perform wavefield separation using the record data by separating the recorded data into upgoing and downgoing wavefields. Due to the physical characteristics of the ocean bottom, the degree of coupling of the geophone sensor to the seabed (or seafloor or ocean bottom) can vary from the degree of coupling of a hydrophone to water. For example, the hydrophone can have a greater degree of coupling to water as compared to a degree of coupling of the geophone sensor to the ocean bottom. Therefore, since motion detection by a geophone sensor can include, be based on, or result from a degree of coupling that is less than the degree of coupling of the hydrophone, the geophone data quality can be degraded relative to the hydrophone data.

Further, quality can be degraded due to the shear-related noise and other on-P-wave energy in the vertical geophone. The degree of coupling of the geophone to the seafloor can affect the phase response, which can vary from location to location. Systems and methods of the present disclosure can determine an operator (e.g., a phase shift) to correct the phase of the geophone to that of the hydrophone to maximize or improve the wavefield separation.

The present disclosure allows for a data processing system to determine a phase-only operator by focusing the analysis at either a mirror primary location or the direct arrival location. A phase-only operator can refer to an operator based on selected phase shifts for each frequency band, and having a constant amplitude across the frequency bands. The mirror location can refer to seismic energy that is received after a near-total internal reflection at the air-water interface (downgoing waves). Direct arrival location can refer to seismic energy that can arrive directly at the node on the seafloor (also downgoing waves). Upgoing waves can refer to seismic energy that traverses the seafloor, reflects off of a subsurface lithologic formation, and is received by the node on the seafloor via the seafloor.

The data processing system obtains seismic data from the hydrophone and seismic data from the geophone. A response operator can be been applied to the geophone to produce processed seismic data. A wavefield separation process can be been applied to the hydrophone and geophone to match or substantially match (e.g., within 5%, 10%, or 20%) the amplitude of the geophone to that of the hydrophone locally in both dip and frequency. The data processing system can select a collection of short offset trace pairs for further processing.

The hydrophone and geophone traces can be frequency partitioned into some number of frequency bands, or voices. A series of phase shifts can be applied to the geophone and the upgoing and downgoing wavefields created for each phase shift of each voice. For each phase shift frequency voice pair the amplitude of the data can be measured in a time window around the mirror primary or the direct arrival, and averaged by wavefield. The data processing system can compute the downgoing to upgoing wavefield amplitude ratio. The data processing system can select the phase shift that results in the largest amplitude ratio as the selected or optimal phase shift for that voice. The data processing system can generate an operator that has a substantially flat amplitude spectrum. The phase spectrum can be defined as the above computed phase shifts at the corresponding dominant frequency of each voice. The generated operator can be used to maximize the separation of the upgoing and downgoing wavefields.

At least one aspect is directed to a system to perform a seismic survey in a marine environment. The system can include a seismic data acquisition unit disposed on a seabed of the marine environment. The seismic data acquisition unit can include a geophone and a hydrophone. The geophone can acquire geophone trace data responsive to an acoustic signal propagated from an acoustic source. The hydrophone can acquire hydrophone trace data responsive to the acoustic signal propagated from the acoustic source. The system can include a data processing system having a calibration component. The calibration component can select first seismic data from the geophone trace data that is within a frequency band. The calibration component can select second seismic data from the hydrophone trace data that is within the frequency band. The calibration component can generate first phase shifted seismic data by applying a first phase shift to the first seismic data. The calibration component can generate second phase shifted seismic data by applying a second phase shift to the first seismic data. The second phase shift can be different from the first phase shift. The calibration component can generate a first upgoing wavefield based on a sum of the first phase shifted seismic data and the second seismic data. The calibration component can generate a second upgoing wavefield based on a sum of the second phase shifted seismic data and the second seismic data. The calibration component can generate a first downgoing wavefield based on a difference of the first phase shifted seismic data and the second seismic data. The calibration component can generate a second downgoing wavefield based on a difference of the second phase shifted seismic data and the second seismic data. The calibration component can determine a first ratio of the first upgoing wavefield and the first downgoing wavefield. The data processing system can determine a second ratio of the second upgoing wavefield and the second downgoing wavefield. The calibration component can select the first phase shift based on the first ratio being greater than the second ratio to produce a calibrated image that compensates for a coupling of the geophone to earth.

At least one aspect is directed to a method of performing a seismic survey in a marine environment by a seismic data acquisition system. The method can be performed by one or more processors of a data processing system executing a calibration component. The method can include providing a seismic data acquisition unit disposed on a seabed in the marine environment. The method can include a geophone of the seismic data acquisition unit acquiring geophone trace data responsive to an acoustic signal propagated by an acoustic source. The method can include a hydrophone of the seismic data acquisition unit acquiring hydrophone trace data responsive to the acoustic signal propagated by the acoustic source. The method can include the data processing system selecting, from the geophone trace data, first seismic data within a frequency band. The method can include the data processing system selecting, from the hydrophone trace data, second seismic data within the frequency band. The method can include the data processing system generating first phase shifted seismic data by applying a first phase shift to the first seismic data. The method can include the data processing system generating second phase shifted seismic data by applying a second phase shift to the first seismic data. The second phase shift can be different from the first phase shift. The method can include the data processing system generating a first upgoing wavefield based on a sum of the first phase shifted seismic data and the second seismic data. The method can include the data processing system generating a second upgoing wavefield based on a sum of the second phase shifted seismic data and the second seismic data. The method can include the data processing system generating a first downgoing wavefield based on a difference of the first phase shifted seismic data and the second seismic data. The method can include the data processing system generating a second downgoing wavefield based on a difference of the second phase shifted seismic data and the second seismic data. The method can include the data processing system determining a first ratio of the first upgoing wavefield and the first downgoing wavefield. The method can include the data processing system determining a second ratio of the second upgoing wavefield and the second downgoing wavefield. The method can include the data processing system selecting the first phase shift based on the first ratio being greater than the second ratio to produce a calibrated image that compensates for a coupling of the geophone to earth.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 2 depicts a system to calibrate a geophone and hydrophone in accordance with an embodiment.

DETAILED DESCRIPTION

Figure 1:
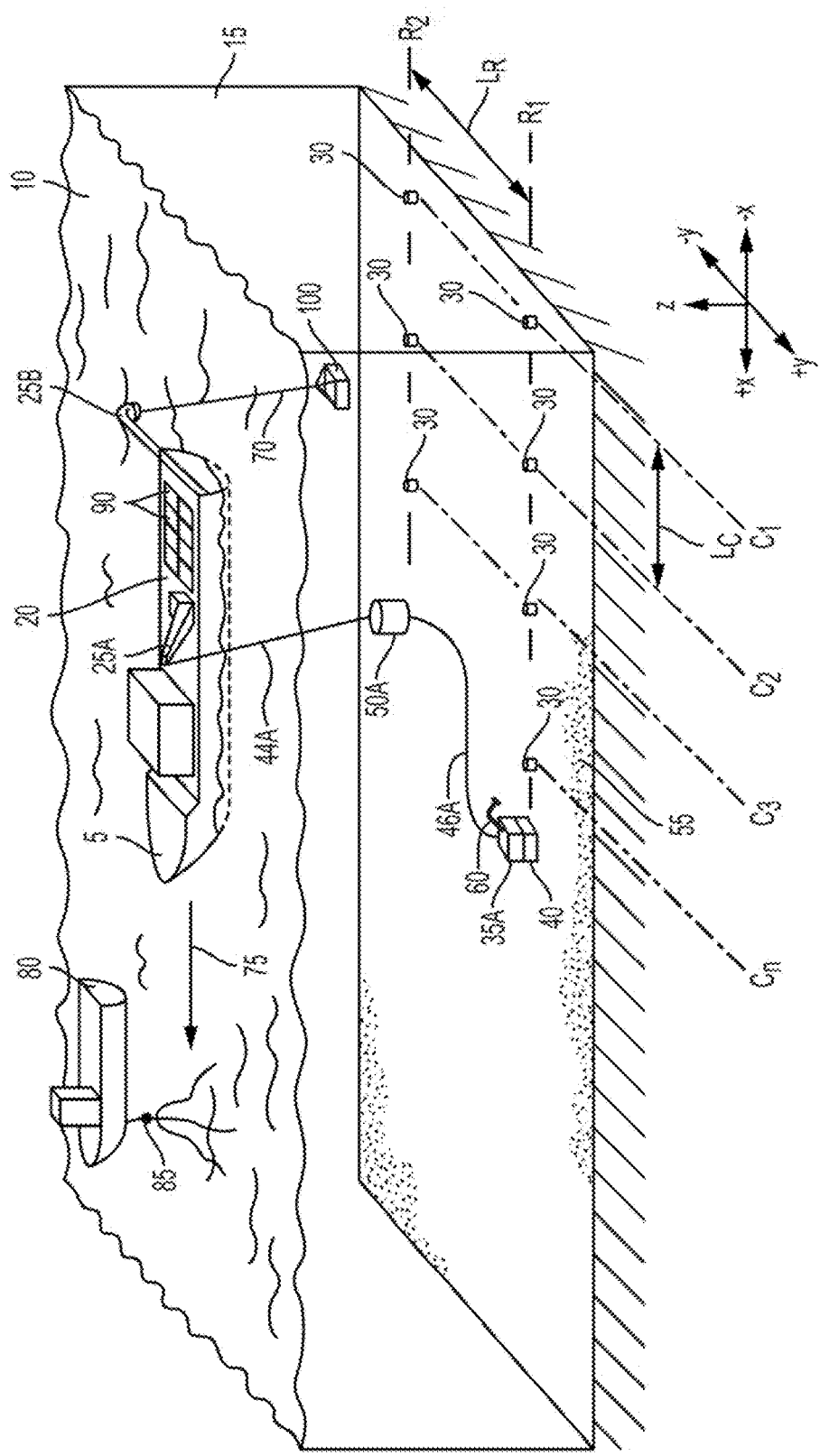
FIG. 1 depicts an isometric schematic view of an embodiment of a seismic operation in deep water.

Embodiments described herein relate to systems and methods of improving the calibration of geophone and hydrophone pairs used in seismic exploration in a marine environment. The present disclosure can compensate for a different degree of coupling of a geophone to a seabed relative to a degree of coupling of a hydrophone to water in order to remove artifacts in the data due to varying degrees of coupling, thereby calibrating the data acquired by the geophone to the data acquired by the hydrophone.

Seismic exploration in deep water can utilize seismic sensor devices, such as geophones and hydrophones, stored on a marine vessel that are transferred from the vessel and placed on or near the seafloor or seabed. These devices can be referred to as Ocean Bottom Cables (OBC), Ocean Bottom Nodes (OBN), or Ocean Bottom Seismometer (OBS) systems. OBS can include or refer to OBNs or OBCs. These devices can include seismic sensors and electronics in sealed packages, and record seismic data on-board the devices while deployed on the seabed. The recorded data can be obtained by using various techniques, including, e.g., a communication link, a remotely operated vehicle, or retrieving the devices from the seabed to a location on the vessel and downloading the recorded data from the devices to a recorder while onboard the vessel.

In operation, hundreds or thousands of OBS units can be deployed from the vessel to the seabed from the vessel. For example, the OBS units can be deployed using a remotely operated vehicle (ROV) tethered to the vessel. The ROV can be lowered below the surface of the water and positioned subsurface. One or more OBS units can be placed by the ROV on the seabed at predetermined locations in a linear row, such as a receiver line. When at least one receiver line consisting of a suitable number of the OBS units is formed, a seismic survey may be performed by providing a source signal, such as an acoustic or vibrational signal. Reflected signals from the seabed and underlying structures are recorded by one or more geophones or hydrophones on the one or more OBS units. The source signal or "shot" can be provided by a second marine vessel, such as a gun boat. In some cases, the source signal can be provided by the first marine vessel.

A data processing system can use the recorded data to generate an image, graph, plotted data, or perform other analysis. For example, the recorded data can include first seismic data acquired from a vertical geophone and second seismic data acquired from a hydrophone. The data processing system can perform wavefield separation using the record data by separating the recorded data into upgoing and downgoing wavefields. Due to the physical characteristics of the ocean bottom, the degree of coupling of the geophone sensor to the seabed can vary from the degree of coupling of a hydrophone to water. For example, the hydrophone can have a greater degree of coupling to water as compared to a degree of coupling of the geophone sensor to the seabed. Therefore, since motion detection by a geophone sensor can include, be based on, or result from a degree of coupling that is less than the degree of coupling of the hydrophone, the geophone data quality can be degraded relative to the hydrophone data. Further, quality can be degraded due to the shear-related noise and other non-P-wave energy in the vertical geophone.

In some cases, the data processing system can eliminate this non-P-wave energy using a frequency-dependent 3D tau-p technique designed to identify reliable P-wave energy and tune the data accordingly. The 3D tau-p filter can filter P-traces that correspond to dip. The result can include a vertical geophone with the same or similar (e.g., within 5%, 10%, or 20%, 30%) phase discrimination as the hydrophone that maintains phase discrimination of upgoing and downgoing waves. Downgoing waves can refer to seismic energy that is received at a node either on direct arrival from the acoustic source, or after reflection at the air-water interface. Upgoing waves can refer to seismic energy that traverses the seafloor and reflects off of a subsurface lithologic formation. The upgoing wave can be received by the OBS unit on the seafloor via the seafloor. Upgoing and downgoing waves can refer to OBS units recording energy reflected more than once. With both a hydrophone and geophone in or proximate to each OBS unit or device, these two wavefields can be processed separately, providing different illumination of the subsurface.

To perform wavefield separation, the data processing system can match or substantially match (e.g., within 5%, 10%, or 20%) the phase of the vertical geophone to the phase of the hydrophone. The wavefield separation process can match the amplitude of the geophone to that of the hydrophone in dip and frequency. However, the coupling of the geophone to the seafloor can affect the phase response, which can vary from location to location. Thus, systems and methods of the present disclosure can determine an operator (e.g., a phase shift) to correct the phase of the geophone to that of the hydrophone to maximize or improve the wavefield separation.

The present disclosure allows for a data processing system to determine a phase only operator by focusing the analysis at either a mirror primary location or the direct arrival location. For example, the mirror location can refer to seismic energy that is received after a near-total internal reflection at the air-water interface (downgoing waves). Direct arrival location can refer to seismic energy that can arrive directly at the seafloor (also downgoing waves).

The data processing system obtains seismic data from the hydrophone and seismic data from the geophone. A response operator can be been applied to the geophone to produce processed seismic data. A wavefield separation process can be been applied to the hydrophone and geophone to match or substantially match (e.g., within 5%, 10%, or 20%) the amplitude of the geophone to that of the hydrophone locally in both dip and frequency. The data processing system can select a collection of short offset trace pairs for further processing.

The hydrophone and geophone traces can be frequency partitioned into some number of frequency bands, or voices. A series of phase shifts can be applied to the geophone and the upgoing and downgoing wavefields created for each phase shift of each voice. For each phase shift frequency voice pair the amplitude of the data can be measured in a time window around the mirror primary or the direct arrival, and averaged by wavefield. The data processing system can compute the downgoing to upgoing wavefield amplitude ratio. The data processing system can select the phase shift that results in the largest amplitude ratio as the selected or optimal phase shift for that voice. The data processing system can generate an operator that has a substantially flat amplitude spectrum. The phase spectrum can be defined as the above computed phase shifts at the corresponding dominant frequency of each voice. The generated operator can be used to maximize the separation of the upgoing and downgoing wavefields.

The data processing system can perform the following steps to compensate for a degree of coupling of the geophone to the seabed to improve the separation of the upgoing and downgoing wavefields:

1. Apply a known system response operator to nominally correct the geophone to the hydrophone. In some cases, the data processing system may not apply the known system response and, instead, determine a total operator.
2. Prepare the amplitudes of the geophone in frequency and dip to match the hydrophone. The data processing system can use a wavefield separation process to prepare the geophone. This process may not modify the phase of the geophone.
3. Select a collection of hydrophone and geophone traces with sufficiently small offsets, for example less the 500 meter XY offset.
4. Frequency partition the traces into a number of bands. The number of bands can include, for example, 22 frequency voices created using a continuous wavelet transform (CWT). Voice can refer to a frequency band. The data processing system can use greater or fewer number of voices, or other methods of creating frequency partitions.
5. Apply a series of phase shifts to the geophone traces. For example, the data processing system can use a range of shifts from −40 degrees to +40 degrees, stepping by 1 degree increments.
6. For each hydrophone and geophone voice/phase shift pair, the data processing system can compute the upgoing wavefield (geophone plus hydrophone) and downgoing wavefield (geophone minus hydrophone)
7. Measure the amplitude in a time window surrounding either the mirror primary event or the direct arrival event on the upgoing and downgoing wavefields.
8. Compute the mean amplitude of the upgoing and downgoing wavefields for each voice and each phase shift for all shots selected in step 3.
9. Compute the ratio of the average amplitudes, average downgoing divided by average upgoing.
10. For each voice, choose the phase shift with the largest amplitude ratio.
11. Build a phase only operator with the shape of the phase spectrum defined by the selected phase shifts at the dominant frequency of each voice. The amplitude spectrum of the operator can be flat across all frequencies.
12. The data processing system can smooth the phase spectrum.
13. The operator can be convolved with the system response operator used in Step 1 to create a single system response and calibration/coupling operator.

FIG. 1 is an isometric schematic view of an embodiment of a seismic operation in deep water facilitated by a first marine vessel 5. FIG. 1 is a non-limiting illustrative example of a marine environment in which the systems and methods of the present disclosure can perform a seismic survey or calibrate a geophone and hydrophone pair.

By way of example, FIG. 1 illustrates a first vessel 5 positioned on a surface 10 of a water column 15 and includes a deck 20 which supports operational equipment. At least a portion of the deck 20 includes space for a plurality of sensor device racks 90 where seismic sensor devices are stored. The sensor device racks 90 may also include data retrieval devices or sensor recharging devices.

The deck 20 also includes one or more cranes 25A, 25B attached thereto to facilitate transfer of at least a portion of the operational equipment, such as an ROV or seismic sensor devices, from the deck 20 to the water column 15. For example, a crane 25A coupled to the deck 20 is configured to lower and raise an ROV 35A, which transfers and positions one or more sensor devices 30 on a seabed 55. The seabed 55 can include a lakebed 55, ocean floor 55, or earth 55. The ROV 35A is coupled to the first vessel 5 by a tether 46A and an umbilical cable 44A that provides power, communications, and control to the ROV 35A. A tether management system (TMS) 50A is also coupled between the umbilical cable 44A and the tether 46A. The TMS 50A may be utilized as an intermediary, subsurface platform from which to operate the ROV 35A. For most ROV 35A operations at or near the seabed 55, the TMS 50A can be positioned approximately 50 feet above seabed 55 and can pay out tether 46A as needed for ROV 35A to move freely above seabed 55 in order to position and transfer seismic sensor devices 30 thereon.

A crane 25B may be coupled (e.g., via a latch, anchor, nuts and bolts, screw, suction cup, magnet, or other fastener) to a stern of the first vessel 5, or other locations on the first vessel 5. Each of the cranes 25A, 25B may be any lifting device or launch and recovery system (LARS) adapted to operate in a marine environment. The crane 25B can be coupled to a seismic sensor transfer device 100 by a cable 70. The transfer device 100 may be a drone, a skid structure, a basket, or any device capable of housing one or more sensor devices 30 therein. The transfer device 100 may be a structure configured as a magazine adapted to house and transport one or more sensor devices 30. The transfer device 100 may include an on-board power supply, a motor or gearbox, or a propulsion system 105. The transfer device 100 can be configured as a sensor device storage rack for transfer of sensor devices 30 from the first vessel 5 to the ROV 35A, and from the ROV 35A to the first vessel 5. The transfer device 100 may include an on-board power supply, a motor or gearbox, or a propulsion system 105. Alternatively, the transfer device 100 may not include any integral power devices or not require any external or internal power source. The cable 70 can provide power or control to the transfer device 100. Alternatively, the cable 70 may be an umbilical, a tether, a cord, a wire, a rope, and the like, that is configured solely for support of the transfer device 100.

The ROV 35A can include a seismic sensor device storage compartment 40 that is configured to store one or more seismic sensor devices 30 therein for a deployment or retrieval operation. The storage compartment 40 may include a magazine, a rack, or a container configured to store the seismic sensor devices. The storage compartment 40 may also include a conveyor, such as a movable platform having the seismic sensor devices thereon, such as a carousel or linear platform configured to support and move the seismic sensor devices 30 therein. In one embodiment, the seismic sensor devices 30 may be deployed on the seabed 55 and retrieved therefrom by operation of the movable platform. The ROV 35A may be positioned at a predetermined location above or on the seabed 55 and seismic sensor devices 30 are rolled, conveyed, or otherwise moved out of the storage compartment 40 at the predetermined location. In some embodiments, the seismic sensor devices 30 may be deployed and retrieved from the storage compartment 40 by a robotic device 60, such as a robotic arm, an end effector or a manipulator, disposed on the ROV 35A.

The seismic sensor device 30 may be referred to as seismic data acquisition unit 30 or node 30. The seismic data acquisition unit 30 can record seismic data. The seismic data acquisition unit 30 may include one or more of at least one geophone, at least one hydrophone, at least one power source (e.g., a battery, external solar panel), at least one clock, at least one tilt meter, at least one environmental sensor, at least one seismic data recorder, at least global positioning system sensor, at least one wireless or wired transmitter, at least one wireless or wired receiver, at least one wireless or wired transceiver, or at least one processor. The seismic sensor device 30 may be a self-contained unit such that all electronic connections are within the unit, or one or more components can be external to the seismic sensor device 30. During recording, the seismic sensor device 30 may operate in a self-contained manner such that the node does not require external communication or control. The seismic sensor device 30 may include several geophones and hydrophones configured to detect acoustic waves that are reflected by subsurface lithological formation or hydrocarbon deposits. The seismic sensor device 30 may further include one or more geophones that are configured to vibrate the seismic sensor device 30 or a portion of the seismic sensor device 30 in order to detect a degree of coupling between a surface of the seismic sensor device 30 and a ground surface. One or more component of the seismic sensor device 30 may attach to a gimbaled platform having multiple degrees of freedom. For example, the clock may be attached to the gimbaled platform to minimize the effects of gravity on the clock.

The degree of coupling of the geophone to the seabed relative to the degree of coupling of the hydrophone to water can vary because geophones are configured to measure the motion wavefield that is transferred from one solid to another solid, such as from the seabed and into the motion sensor of the geophone. In seabeds or other physical objects, there is some attenuation or change of the motion wavefield at the solid to solid interface where this motion is transferred into the geophone. Different solids can attenuate the wavefield differently. For example, attenuation of a geophone sensor in mud may be different than the attenuation of a geophone sensor in sand or on rock. Further, solid land geology can be inconsistent across the area of a survey and these physical differences in the seabed can create differences in geophone attenuation across a survey.

Hydrophones measure a pressure wavefield that is transferred from a liquid to a solid, such as from an aqueous medium into the hydrophone pressure sensor. As compared to the solid-to-solid interface associated with the geophone, the pressure wavefield can undergo less attenuation or change at the liquid to solid interface where this motion due to the pressure wavefield is transferred into the hydrophone. Further, liquid sea water can be relatively consistent across the area of a survey as compared to the geology of the seabed, so there may be minimal differences in hydrophone attenuation across a survey.

The calibration techniques of the systems and methods of the present disclosure can account for the possible differences in geophone attenuation across the area of a survey, which may be caused by variations in the sea bed geology. The calibration technique can account for the differences in geophone attenuation by using the attenuation of a nearby hydrophone as a standard or "exemplar of low attenuation", "exemplar of very low attenuation", "exemplar of lowest attenuation", or other amount of attenuation that is desired, acceptable, satisfactory, or below a threshold for the particular survey, and then adjust or calibrate the geophone attenuation to emulate the hydrophone attenuation. As the calibration focuses on identifying and improving degraded data resulting from geologic inconsistencies, the data can be improved for data outliers—such as data collected from those geophones on the sea bed at significant geological variations from the rest of the survey. Improving the data quality for the geophones associated with the data outliers can improve the data for some or all of the survey. Thus, application of the operator and the calibration technique can significantly improve the quality of the survey data.

For example, in a deployment operation, a first plurality of seismic sensor devices, comprising one or more sensor devices 30, may be loaded into the storage compartment 40 while on the first vessel 5 in a pre-loading operation. The ROV 35A, having the storage compartment coupled thereto, is then lowered to a subsurface position in the water column 15. The ROV 35A utilizes commands from personnel on the first vessel 5 to operate along a course to transfer the first plurality of seismic sensor devices 30 from the storage compartment 40 and deploy the individual sensor devices 30 at selected locations on the seabed 55. Once the storage compartment 40 is depleted of the first plurality of seismic sensor devices 30, the transfer device 100 is used to ferry a second plurality of seismic sensor devices 30 as a payload from first vessel 5 to the ROV 35A.

The transfer system 100 may be preloaded with a second plurality of seismic sensor devices 30 while on or adjacent the first vessel 5. When a suitable number of seismic sensor devices 30 are loaded onto the transfer device 100, the transfer device 100 may be lowered by crane 25B to a selected depth in the water column 15. The ROV 35A and transfer device 100 are mated at a subsurface location to allow transfer of the second plurality of seismic sensor devices 30 from the transfer device 100 to the storage compartment 40. When the transfer device 100 and ROV 35A are mated, the second plurality of seismic sensor devices 30 contained in the transfer device 100 are transferred to the storage compartment 40 of the ROV 35A. Once the storage compartment 40 is reloaded, the ROV 35A and transfer device 100 are detached or unmated and seismic sensor device placement by ROV 35A may resume. In one embodiment, reloading of the storage compartment 40 is provided while the first vessel 5 is in motion. If the transfer device 100 is empty after transfer of the second plurality of seismic sensor devices 30, the transfer device 100 may be raised by the crane 25B to the vessel 5 where a reloading operation replenishes the transfer device 100 with a third plurality of seismic sensor devices 30. The transfer device 100 may then be lowered to a selected depth when the storage compartment 40 is reloaded. This process may repeat as until a desired number of seismic sensor devices 30 have been deployed.

Using the transfer device 100 to reload the ROV 35A at a subsurface location reduces the time required to place the seismic sensor devices 30 on the seabed 55, or "planting" time, as the ROV 35A is not raised and lowered to the surface 10 for seismic sensor device reloading. Further, mechanical stresses placed on equipment utilized to lift and lower the ROV 35A are minimized as the ROV 35A may be operated below the surface 10 for longer periods. The reduced lifting and lowering of the ROV 35A may be particularly advantageous in foul weather or rough sea conditions. Thus, the lifetime of equipment may be enhanced as the ROV 35A and related equipment are not raised above surface 10, which may cause the ROV 35A and related equipment to be damaged, or pose a risk of injury to the vessel personnel.

Likewise, in a retrieval operation, the ROV 35A can utilize commands from personnel on the first vessel 5 to retrieve each seismic sensor device 30 that was previously placed on seabed 55. The retrieved seismic sensor devices 30 are placed into the storage compartment 40 of the ROV 35A. In some embodiments, the ROV 35A may be sequentially positioned adjacent each seismic sensor device 30 on the seabed 55 and the seismic sensor devices 30 are rolled, conveyed, or otherwise moved from the seabed 55 to the storage compartment 40. In some embodiments, the seismic sensor devices 30 may be retrieved from the seabed 55 by a robotic device 60 disposed on the ROV 35A.

Once the storage compartment 40 is full or contains a pre-determined number of seismic sensor devices 30, the transfer device 100 is lowered to a position below the surface 10 and mated with the ROV 35A. The transfer device 100 may be lowered by crane 25B to a selected depth in the water column 15, and the ROV 35A and transfer device 100 are mated at a subsurface location. Once mated, the retrieved seismic sensor devices 30 contained in the storage compartment 40 are transferred to the transfer device 100. Once the storage compartment 40 is depleted of retrieved sensor devices, the ROV 35A and transfer device 100 are detached and sensor device retrieval by ROV 35A may resume. Thus, the transfer device 100 is used to ferry the retrieved seismic sensor devices 30 as a payload to the first vessel 5, allowing the ROV 35A to continue collection of the seismic sensor devices 30 from the seabed 55. In this manner, sensor device retrieval time is significantly reduced as the ROV 35A is not raised and lowered for sensor device unloading. Further, safety issues and mechanical stresses placed on equipment related to the ROV 35A are minimized as the ROV 35A may be subsurface for longer periods.

In this embodiment, the first vessel 5 may travel in a first direction 75, such as in the +X direction, which may be a compass heading or other linear or predetermined direction. The first direction 75 may also account for or include drift caused by wave action, current(s) or wind speed and direction. In one embodiment, the plurality of seismic sensor devices 30 are placed on the seabed 55 in selected locations, such as a plurality of rows $R_n$ in the X direction ($R_1$ and $R_2$ are shown) or columns $C_n$ in the Y direction ($C_1$-$C_n$ are shown), wherein n equals an integer. In one embodiment, the rows $R_n$ and columns $C_n$ define a grid or array, wherein each row $R_n$ (e.g., $R_1$ -$R_2$) comprises a receiver line in the width of a sensor array (X direction) or each column $C_n$ comprises a receiver line in a length of the sensor array (Y direction). The distance between adjacent sensor devices 30 in the rows is shown as distance $L_R$ and the distance between adjacent sensor devices 30 in the columns is shown as distance $L_C$. While a substantially square pattern is shown, other patterns may be formed on the seabed 55. Other patterns include non-linear receiver lines or non-square patterns. The pattern(s) may be pre-determined or result from other factors, such as topography of the seabed 55. In one embodiment, the distances $L_R$ and $L_C$ may be substantially equal and may include dimensions between about 60 meters to about 400 meters, or greater. The distance between adjacent seismic sensor devices 30 may be predetermined or result from topography of the seabed 55 as described above.

The first vessel 5 is operated at a speed, such as an allowable or safe speed for operation of the first vessel 5 and any equipment being towed by the first vessel 5. The speed may take into account any weather conditions, such as wind speed and wave action, as well as currents in the water column 15. The speed of the vessel may also be determined by any operations equipment that is suspended by, attached to, or otherwise being towed by the first vessel 5. For example, the speed can be limited by the drag coefficients of components of the ROV 35A, such as the TMS 50A and umbilical cable 44A, as well as any weather conditions or currents in the water column 15. As the components of the ROV 35A are subject to drag that is dependent on the depth of the components in the water column 15, the first vessel speed may operate in a range of less than about 1 knot. In this embodiment, wherein two receiver lines (rows $R_1$ and $R_2$) are being laid, the first vessel includes a first speed of between about 0.2 knots and about 0.6 knots. In other embodiments, the first speed includes an average speed of between about 0.25 knots, which includes intermittent speeds of less than 0.25 knots and speeds greater than about 1 knot, depending on weather conditions, such as wave action, wind speeds, or currents in the water column 15.

During a seismic survey, one receiver line, such as row $R_1$ may be deployed. When the single receiver line is completed a second vessel 80 can be used to provide a source signal. In some cases, the first vessel or other device can provide the source signal. The second vessel 80 is provided with a source device or acoustic source device 85, which may be a device capable of producing acoustical signals or vibrational signals suitable for obtaining the survey data. The source signal propagates to the seabed 55 and a portion of the signal is reflected back to the seismic sensor devices 30. The second vessel 80 may be required to make multiple passes, for example at least four passes, per a single receiver line (row $R_1$ in this example). During the time the second vessel 80 is making the passes, the first vessel 5 continues deployment of a second receiver line. However, the time involved in making the passes by the second vessel 80 is much shorter than the deployment time of the second receiver line. This causes a lag time in the seismic survey as the second vessel 80 sits idle while the first vessel 5 is completing the second receiver line.

The first vessel 5 can use one ROV 35A to lay sensor devices to form a first set of two receiver lines (rows $R_1$ and $R_2$) in any number of columns, which may produce a length of each receiver line of up to and including several miles. In one embodiment, the two receiver lines (rows $R_1$ and $R_2$) are substantially parallel. When a single directional pass of the first vessel 5 is completed and the first set (rows $R_1$, $R_2$) of seismic sensor devices 30 are laid to a predetermined length, the second vessel 80, provided with the source device 85, is utilized to provide the source signal. The second vessel 80 can make eight or more passes along the two receiver lines to complete the seismic survey of the two rows $R_1$ and $R_2$.

While the second vessel 80 is shooting along the two rows $R_1$ and $R_2$, the first vessel 5 may turn 180 degrees and travel in the −X direction in order to lay seismic sensor devices 30 in another two rows adjacent the rows $R_1$ and $R_2$, thereby forming a second set of two receiver lines. The second vessel 80 may then make another series of passes along the second set of receiver lines while the first vessel 5 turns 180 degrees to travel in the +X direction to lay another set of receiver lines. The process may repeat until a specified area of the seabed 55 has been surveyed. Thus, the idle time of the second vessel 80 is minimized as the deployment time for laying receiver lines is cut approximately in half by deploying two rows in one pass of the vessel 5.

Although only two rows $R_1$ and $R_2$ are shown, the sensor device 30 layout is not limited to this configuration as the ROV 35A may be adapted to layout more than two rows of sensor devices in a single directional tow. For example, the ROV 35A may be controlled to lay out between three and six rows of sensor devices 30, or an even greater number of rows in a single directional tow. The width of a "one pass" run of the first vessel 5 to layout the width of the sensor array can be limited by the length of the tether 46A or the spacing (distance $L_R$) between sensor devices 30.

Referring now to FIG. 2, a system 200 to calibrate a geophone and hydrophone of a seismic data acquisition unit is shown. The system 200 can include at least one data processing system 205. The system 200 can include at least one computing device 225 or display device 225. The system 200 can include a seismic data acquisition unit 230 (or node 230). The seismic data acquisition unit can include one or more component or function of sensor device 30. The seismic data acquisition unit 230 can include a hydrophone 235 and a geophone 240. The seismic data acquisition unit 230 can include a dual sensor configuration. A dual sensor can refer to a configuration having a sensor that measures pressure and one or more sensors that measure motion. A dual sensor configuration of a seismic data acquisition unit 230 can include the hydrophone 235, one or more geophones 240, or one or more accelerometers. The one or more geophones 240 can refer to a multi-component geophone that measures motion 3-dimensionally, such as in an X-axis, Y-axis, and Z-axis. The hydrophone 235 and geophone 240 can be closely spaced. For example, the vertical separation between the hydrophone 235 and the geophone 240 can be less than or equal to 1 meter, 0.5 meters, 1.5 meters, or 2 meters. For example, the closely spaced hydrophone and geophone can be built into a single housing and deployed together as part of a seismic data acquisition unit 230 (e.g., sensor device 30).

The data processing system 205 can include a calibration component 210, an image rendering component 215, and a database 220. The database 220 can store data records or data structures including, for example, seismic data 226 acquired by the seismic data acquisition unit 230, thresholds 227, or frequency bands 228. The calibration component 210 and image rendering component 215 can each include at least one processing unit or other logic device such as programmable logic array engine, or module configured to communicate with the database repository or database 220. The calibration component 210, image rendering component 215 and data repository 220 can be separate components, a single component, or part of the data processing system 205. The system 200 and its components, such as a data processing system, may include hardware elements, such as one or more processors, logic devices, or circuits. For example, the calibration component 210 can include one or more sub-components the data processing system to select seismic data, generate phase shifted data, generate upgoing and downgoing wavefields, determine ratios based on the upgoing and downgoing wavefields, and select phase shifts based on the ratios to produce a calibrated image.

The data processing system 205 can include at least one logic device such as a computing device having a processor to communicate via a network, for example with the computing device 330. The data processing system 205 can include at least one server. For example, the data processing system 205 can include a plurality of servers located in at least one data center. The data processing system 205 can include multiple, logically-grouped servers and facilitate distributed computing techniques. The logical group of servers may be referred to as a server farm or a machine farm. The servers can also be geographically dispersed. A machine farm may be administered as a single entity, or the machine farm can include a plurality of machine farms.

The system 200 can include one or more seismic data acquisition units 230. The one or more seismic data acquisition units 230 can be disposed on a seabed in a marine environment. The seabed can include, for example, a lakebed, an ocean floor, or earth. Each of the one or more seismic data acquisition units 230 can include a hydrophone 235 and a geophone 240. One or both of the hydrophone 235 and geophone 240 can be disposed within the seismic data acquisition unit 230 or be external to the seismic data acquisition unit 230. The geophone 240 can acquire geophone trace data responsive to an acoustic signal propagated from an acoustic source. The hydrophone 235 can acquire hydrophone trace data responsive to the acoustic signal propagated from the acoustic source.

The data processing system 205 can process dual sensor (e.g., hydrophone and vertical geophone) data to remove noise as well as enhance the wavefield separation. The data processing system can decompose data simultaneously into dip and frequency while retaining temporal locality. The noise removed can include coherent geophone noise from the vertical geophone, such as V(z) noise.

Each seismic data acquisition unit 230 can record the amplitude of the incoming signals over time at the seismic data acquisition unit's 230 particular location, thereby generating a seismic survey of the subsurface. The seismic energy recorded by each seismic data acquisition unit 230 for each source activation during data acquisition can be referred to as a "trace." The one or more seismic data acquisition units 230 utilized in such operations can include pressure sensors, such as hydrophones 235, and motion sensors, such as single or multi-component geophones 240 or accelerometers. Since the physical location of the sources and receivers is known, the time it takes for a reflection wave to travel from a source to a sensor can be directly related to the depth of the formation that caused the reflection. Thus, the recorded signals, or seismic energy data (or seismic data), from the array of receivers can be analyzed to yield information about the depth and arrangement of the subsurface formations, some of which can contain oil or gas accumulations.

The data processing system 205 can organize the data from the array of receivers into common geometry gathers, where data from a number of receivers that share a common geometry are analyzed together. A gather can provide information about a particular location or profile in the area being surveyed. The data can be organized into many different gathers and processed before the analysis is completed in an effort to map the entire survey area. The types of gathers employed can include common midpoint (e.g., the receivers and their respective sources share a common midpoint), common source (e.g., the receivers share a common source), common offset (e.g., the receivers and their respective sources have the same separation or "offset"), and common receiver (e.g., a number of sources share a common receiver).

The data in a gather can be recorded or assembled in the time-offset domain. The seismic traces recorded in the gather can be assembled or displayed together as a function of offset (e.g., the distance of the seismic data acquisition unit 230 from a reference point) and of time. The time for a given signal to reach and be detected by successive seismic data acquisition units 230 is a function of its velocity and the distance traveled. Those functions can be referred to as kinematic travel time trajectories. When the gathered data is displayed in the time-offset domain (the T-X domain), the amplitude peaks corresponding to reflection signals detected at the receivers can align into patterns that mirror the kinematic travel time trajectories. These trajectories can indicate depths at which formations exist.

However, up-going reflected signals that indicate the presence of subsurface lithologic formations can have various types of noise. Primary reflection signals can include signals that travel down to the reflective surface and then back up to a receiver. When a source is discharged, however, a portion of the signal can travel directly to seismic data acquisition units 230 without reflecting off of any subsurface features. In addition, a signal may bounce off of a subsurface feature, bounce off the surface, and then bounce off the same or another subsurface feature, one or more times, creating so-called multiple reflection signals. Other portions of the detected signal may include noise from ground roll, refractions, and unresolvable scattered events. Some noise, both random and coherent, may be generated by natural and man-made events outside the control of the survey, such as wind noise.

This noise can be detected along with the reflection signals that indicate subsurface features. Thus, the noise and reflection signals tend to overlap when the survey data is displayed in T-X space. The overlap can mask primary reflection signals, the so-called seismic events, and make it difficult or impossible to identify patterns in the display upon which inferences about subsurface geological strata may be drawn. Accordingly, the data processing system can use various techniques to process seismic data in such a way that noise is separated from primary reflection signals.

The techniques can provide a separation of signal and noise by transforming the data from the T-X domain to other domains, such as the frequency-wavenumber (F-K) or the time-slowness (tau-P) domains, where there is less overlap between the signal and noise data. Once the data is transformed, the data processing system can use one or more mathematical filters to transform the data to eliminate or reduce noise to enhance the primary reflection signals. The data processing system can then inverse transform the data back into the T-X domain for interpretation or further processing. For example, the data processing system can use so-called Radon filters to attenuate or remove multiple reflection signals. Radon filters can use Radon transformation equations to transform data from the T-X domain to the tau-P domain where it can be filtered. More specifically, the data processing system can transform the T-X data along kinematic travel time trajectories having constant velocities and slownesses, where slowness p can be the reciprocal of velocity ($p=1/v$).

The data processing system 205 can address noise using the combination of dual sensor (hydrophone and vertical geophone) to attenuate ghost reflections from the air water interface. In the dual sensor technique, up-going and downgoing waves can be measured differently by a velocity sensor while direction of progression of the wave has no polarity significance to the hydrophone. Dual sensor processing for ghost elimination can include summing recordings made with co-located hydrophones and geophones placed on the sea floor. For a vertical wave path, a scalar can be applied to one of the two sensors to account for bottom reflectivity and suppress water layer reverberations. However, since the geophone may not be firmly coupled with the ocean bottom, the data processing system may apply a phase shift operator to calibrate the data acquired by the geophone to compensate for a degree of coupling of the geophone to the seabed. Also, the geophone may provide attenuated amplitude sensitivity to waves arriving at the sensor package in a direction other than its presumably vertical orientation while the hydrophone shows indifference to angle of arrival.

The data processing system 205 can include a calibration component 210 to process the data acquired by the geophone 235 and hydrophone 240 of the seismic data acquisition unit 230. The calibration component 210 can compensate for the degree of coupling of the geophone 240 to the seabed (or bottom of any aqueous medium) to match the coupling of the hydrophone 235. The calibration component 210 can obtain seismic data acquired by the geophone 240 and the hydrophone 235. The seismic data acquired by the geophone can be referred to as geophone trace data or first seismic data, and the seismic data acquired by the hydrophone can be referred as hydrophone trace data or second seismic data. The first and second seismic data can be acquired responsive to one or more acoustic signals propagated from one or more acoustic sources 85. The calibration component 210 can select the first and second seismic data from the geophone trace data and the hydrophone trace data, respectively. The calibration component 210 can select the first and second seismic data to be within a frequency band, such as 2 Hz to 100 Hz. The selected first and second seismic data can include or be within the same frequency bands.

The first and second seismic data can include or be based on trace data. A trace can refer to a unique source event (e.g., acoustic source event) recorded in a unique component (e.g., a particular seismic data acquisition unit 230) in a particular deployment. The source can create the wavefield that traverses through water, and the seismic data acquisition unit 230 can record an arrival of the wavefield. The seismic data acquisition unit 230 can continuously record for a time period that starts approximately when the acoustic source is triggered. The trace data can include hydrophone data and vertical geophone data. The trace can include a segment of the continuous time period during which data is being recorded. For example, the continuous time period of recording can include one or more shot events.

The first seismic data acquired by the geophone can include a time stamp and an indication of motion detected by a geophone. The indication of motion can be based on a variance in an electric field, or change in spring mass. In some cases, the geophone can include a micro-electromechanical systems (MEMS). The first seismic data of the geophone can indicate a Z-axis component of the motion. The Z-axis component can refer to a vertical component of motion. The vertical component can be substantially perpendicular to the seabed (e.g., plus or minus 20% of perpendicular to the seabed). In some cases, the geophone 240 can include a multi-axis geophone, and the data processing system 205 can obtain the z-axis or vertical component data for further processing. In some cases, the data processing system 205 can process the data from the multiple components to determine the vertical component of the geophone data. The first seismic data can be recorded based on time interval, such as every 1 millisecond, 2 milliseconds, 3 milliseconds, 4 milliseconds, or some other time interval.

The second seismic data acquired by the hydrophone can include a time stamp and an indication of a pressure-based wavefield, such as a bar-meter. The indication can be converted to millivolts via, for example, a piezoelectric sensor. The second seismic data can be recorded based on time interval, such as every 1 millisecond, 2 milliseconds, 3 milliseconds, 4 milliseconds, or some other time interval. The geophone 240 and the hydrophone 235 can be different types of devices or sensors, where the geophone detects motion and the hydrophone measures a pressure change.

The first seismic data and the second seismic data can be paired with one another. For example, the first seismic data and the second seismic data can have the same or similar timestamps and record waves from one or more of the same acoustic sources. For example, the first seismic data can include a geophone trace and the second seismic data can include a hydrophone trace paired with the geophone trace. The geophone trace and the hydrophone trace can have an offset within a threshold, such as an X-Y offset of less than 500 meters. The threshold values can be stored in database 220. Threshold values can include, e.g., 300 meters, 400 meters, 500 meters, 600 meters, 700 meters, or 800 meters.

The data processing system 205 can frequency partition the seismic data acquired from the geophone and the hydrophone to select data within a frequency band. For example, the recorded wavefield can be recorded up to a certain frequency based on the sample rate. The frequency band can range, for example, from 2 Hz to 100 Hz. To compensate for imperfect coupling (e.g., a degree of coupling that is different from or less than a degree of coupling of the hydrophone to water, such as a 1% difference, 2% difference, 5% difference, 10% difference, 15% difference, 20% difference, 30% difference, 40% difference 50% difference or more) of the geophone, the data processing system 205 can apply a frequency dependent phase correction. The data processing system 205 can select data from one or more frequency bands for further processing. The data processing system 205 can select 3 or more frequency bands. For example, the data processing system 205 can select 10 frequency bands, 15 frequency bands, 20 frequency bands, 22 frequency bands, or 25 frequency bands or more. Desired or predetermined frequency bands can be stored in database 220.

Upon obtaining the first seismic data, the data processing system 205 can apply a series of phase shifts to create a corresponding series of phase shifted data. For example, the data processing system can apply a first phase shift to the first seismic data to generate first phase shifted data. The data processing system can apply a second phase shift to the first seismic data to generate second phase shifted data. The data processing system can apply further phase shifts to generate further phase shifted data. For example, the data processing system can apply a third phase shift to generate third phase shifted seismic data, and apply a fourth phase shift to generate fourth phase shifted seismic data. The first, second, third and fourth phase shifts can each be different. For example, the series of phase shifts can range, for example, from −40 degrees to +40 degrees; −50 degrees to +50 degrees; −60 degrees to +60 degrees; or −40 degrees to +60 degrees. The series of phase shifts can step by, e.g., 1 degree increments; 0.5 degree increments, 2 degree increments, 1.5 degree increments, or 3 degree increments. For example, the first phase shift can include a phase shift of −40 degrees; the second phase shift can include a phase shift of −39 degrees; the third phase shift can include a phase shift of −38 degrees, etc.

With the phase shifted seismic data based on the geophone, and the second seismic data acquired from the hydrophone, the data processing system 205 can generate upgoing wavefield. The data processing system 205 can generate a first upgoing wavefield by summing or otherwise combining the first phase shifted seismic data (e.g., first phase shift applied to geophone trace data) and the second seismic data (e.g., hydrophone trace data). The data processing system 205 can generate a second upgoing wavefield based on a sum of the second phase shifted seismic data (e.g., second phase shift applied to geophone trace data) and the second seismic data (e.g., hydrophone trace data). The data processing system 205 can further generate a first downgoing wavefield based on a difference of the first phase shifted seismic data and the second seismic data. The data processing system 205 can generate a second downgoing wavefield based on a difference of the second phase shifted seismic data and the second seismic data.

Upon determining the upgoing and downgoing wavefields for each frequency band and phase shift applied to geophone trace data, the data processing system 205 can determine a ratio of upgoing to downgoing wavefields. For example, the data processing system 205 can determine a first ratio of the first upgoing wavefield and the first downgoing wavefield, and determine a second ratio of the second upgoing wavefield and the second downgoing wavefield. The data processing system 205 can compare the first ratio to the second ratio. Responsive to the comparison, the data processing system 205 can select the first phase shift based on the first ratio being greater than the second ratio. The data processing system 205 can determine that since the first ratio is greater than the second ratio, the first ratio can provide a greater wavefield separation between upgoing and downgoing wavefields, thereby providing an improved calibration of the geophone data that compensates for imperfect coupling of the geophone to the seabed. The data processing system 205 can thereby produce a calibrated image that compensates for an imperfect coupling of the geophone to earth or the seabed.

To generate the ratio of upgoing and downgoing wavefields, the data processing system 205 can determine an amplitude of the upgoing wavefield and an amplitude of the downgoing wavefield. The data processing system 205 can determine the amplitude in a time window surrounding the mirror primary event on the downgoing wavefield or the direct arrival event on the upgoing wavefield.

The data processing system 205 can determine the first ratio as the amplitude of the first downgoing wavefield divided by the amplitude of the first upgoing wavefield. The data processing system 205 can determine the second ratio as the amplitude of the second downgoing wavefield divided by the amplitude of the second upgoing wavefield.

The first ratio can be greater than the second ratio if the first ratio is a larger number. For example, a ratio of 4 to 1 (or 4 divided by 1) can be greater than a second ratio of 3 to 2 (or 3 divided by 2). For example, if the amplitude of the first downgoing wave is 4, the amplitude of the second downgoing wave is 3, the amplitude of the first upgoing wave is 1, and the amplitude of the second upgoing wave is 2, then the first ratio is 4/1 which is greater than the second ratio of 3/2.

In some cases, the data processing system 205 can determine an average or mean amplitude of the upgoing and downgoing wavefields for each frequency band and each phase shift in the series of phase shifts. For example, if the seismic data includes trace data for multiple acoustic shots, the data processing system 205 can determine an average amplitude for the first upgoing wavefield for each of the frequency bands and phase shifts. The data processing system 205 can use one or more averaging techniques, including, for example, a trimmed mean technique that determine the average by removing a designated percentage of the largest and smallest values before determining the mean. The designated percentage can be, for example, 1%, 5%, 7%, 10%, 15% or some other percentage. The data processing system 205 can remove values based on other characteristics, such as time or standard deviation. The data processing system 205 can determine a root mean square average.

The data processing system 205 can further determine an average amplitude for the first downgoing wavefield for each of the plurality of frequency bands and phase shifts. For example, if there were multiple shots from a single acoustic source, the data processing system 205 can determine an average amplitude across the multiple shots for each frequency band and phase shift (e.g., for a specific frequency band and phase shift, sum the amplitudes from each shot and divide the sum by the number of shots). In some cases, the data processing system 205 can determine an average amplitude for a specific shot and specific phase shift across a number of frequency bands (e.g., for a specific acoustic shot and phase shift, sum the amplitudes across a number of frequency bands, and divide the sum by the number of frequency bands).

The data processing system 205 can select the phase shift corresponding to the highest ratio in each frequency band. For a specific frequency band, the data processing system 205 can rank the ratio of amplitudes of downgoing to upgoing wavefields for each phase shift to determine the highest ratio. The data processing system 205 can compare the ratios with one another to select the highest ratio. For example, the data processing system 205 can compare the first ratio with the second ratio to select the first ratio based on the first ratio being greater than the second ratio. The data processing system 205 can use this phase shift to generate a phase operator.

The data processing system 205 can select a phase shift for each frequency band. For example, the data processing system 205 can partition the first seismic data into a number of frequency bands. The data processing system 205 can similarly partition the second seismic data into the number of frequency bands. The data processing system 205 can determine upgoing and downgoing wavefields for each of the number of frequency bands. The data processing system 205 can determine an average amplitude for the first upgoing wavefield for each of the plurality of frequency bands. The data processing system 205 can determine an average amplitude for the first downgoing wavefield for each of the plurality of frequency bands. The average amplitude can refer to determining an average amplitude across multiple acoustic shots.

The data processing system 205 can use the average amplitudes of the upgoing and downgoing wavefields to generate ratios for each phase shift in each frequency band. The ratio for a frequency band can be determined by dividing an average amplitude of a downgoing wavefield for a frequency band by an average amplitude of an upgoing wavefield for the frequency band. For example, the data processing system 205 can determine a third ratio for each of the plurality of frequency bands based on the average amplitude for the first downgoing wavefield for each of the plurality of frequency bands divided by the average amplitude for the first upgoing wavefield for each of the plurality of frequency bands. The data processing system 205 can similar determine a fourth ratio for each of the plurality of frequency bands based on the average amplitude for the second downgoing wavefield for each of the plurality of frequency bands divided by the average amplitude for the second upgoing wavefield for each of the plurality of frequency bands. The data processing system can 205 can compare each of the third ratios with each of the fourth ratios in a particular frequency band to identify the highest ratio. For example, in a first frequency band, the third ratio can be the highest ratio; in a second frequency band, the fourth ratio can be the highest ratio; in a third frequency band, the third ratio can be the highest ratio. The highest ratio can correspond to a phase shift in the range of the series of phase shifts applied to the geophone trace data. Thus, in the first frequency band, the selected phase shift for calibration can be the first phase shift applied to the geophone trace data; in the second frequency band, the selected phase shift for calibration can be the second phase shift applied to the geophone trace data; and in the third frequency band, the selected phase shift for calibration can be the first phase shift applied to the geophone trace data. In the event the data processing system 205 applies more than two phase shifts to the geophone trace data, the data processing system 205 can select the highest ratio, identify the corresponding phase shift, and use the identified corresponding phase shift for calibration for the frequency band.

The data processing system 205 can generate a phase operator with the shape of the phase spectrum defined by the selected phase shifts for each frequency band. The amplitude spectrum of the operator may be flat across all frequencies. For example, the data processing system 205 can generate a series of phase shifts for each frequency band, generate a corresponding series of upgoing and downgoing wavefields, generate a corresponding series of ratios of amplitudes of the upgoing and downgoing wavefields, and select the highest ratio in each frequency band to generate the phase operator. The phase operator may be a phase-only operator where the amplitude is constant across all frequency bands. For example, the amplitude may be 1 or some other constant value.

The data processing system 205 can smooth the phase operator to create an approximating function that captures important patterns in the selected phase shifts while leaving out noise or other fine-scale structures or rapid phenomena or artifacts. The data processing system 205 can use a linear smoother, or other smoothing algorithm such as a moving average, rectangular or unweighted sliding-average, or triangular or weighted average.

In the event the data processing system 205 has access to a predetermined system response operator (e.g., a known system response operator that can be used to nominally correct the geophone to the hydrophone), the data processing system 204 can convolve or otherwise combine the generated phase operator with the predetermined system response operator to generate a single system response and calibration/coupling operator.

The data processing system 205 can apply the generated phase operator to calibrate the geophone, calibrate data acquired by the geophone, or generate an image, graph, or other data plot. The data processing system 205 can apply the single response and calibration/coupling operator to calibrate the geophone 240 and the hydrophone 235, calibrate data acquired by the geophone, or generate an image, graph, or other data plot.

The data processing system 205 can calibrate the specific geophone 240 to the specific hydrophone 235. The data processing system 205 calibrate the geophone (e.g., data acquired by the geophone) based on the first phase shift selected based on the first ratio being greater than the second ratio.

The data processing system 205 can include an image rendering component 215 to generate an image, graph, or other data plot using the calibrated seismic data. The data processing system 205 can generate the image using the phase operator that includes the phase shift selected for each of the frequency bands. The image rendering component 215 can generate a 2-dimensional image of the seismic data, 3-dimensional image of the seismic data, or temporal images of the seismic data. The image rendering component 215 can generate the image using two or more colors, grayscale, fills, or patterns. The data processing system 205 can generate a dynamic plot that can be interacted with. For example, a user can zoom, expand, change the scale, or otherwise manipulate the rendered image or plot.

The data processing system 205 can generate an improved image or plot using the phase operator constructed with the phase shifts corresponding to the highest ratio for each of the frequency bands. The image can be an improvement because the phase operator can compensate for the imperfect coupling of the geophone to the seabed. The geophone 240 can be imperfectly coupled because it may be resting at an angle, on a rock or other sediments, have a protrusion, or for other reasons.

The data processing system 205 can use the generated phase operator to generate an image with improved wavefield separation, while using fewer computing resources. The wavefield separation can be improved, for example, to 24 to 32 dB difference in amplitudes of the up-going and down-going wavefields. The data processing system 205 can use fewer computing resource because it can compute a phase-only operator as opposed to having to compute an operator based also on amplitude. By using a constant amplitude and computing a phase-only operator using phase shifts for each frequency band selected based on a ratio of upgoing and downgoing wavefields, the data processing system 205 can reduce computing resource utilization while produce an image with improved wavefield separation.

Figure 3A:
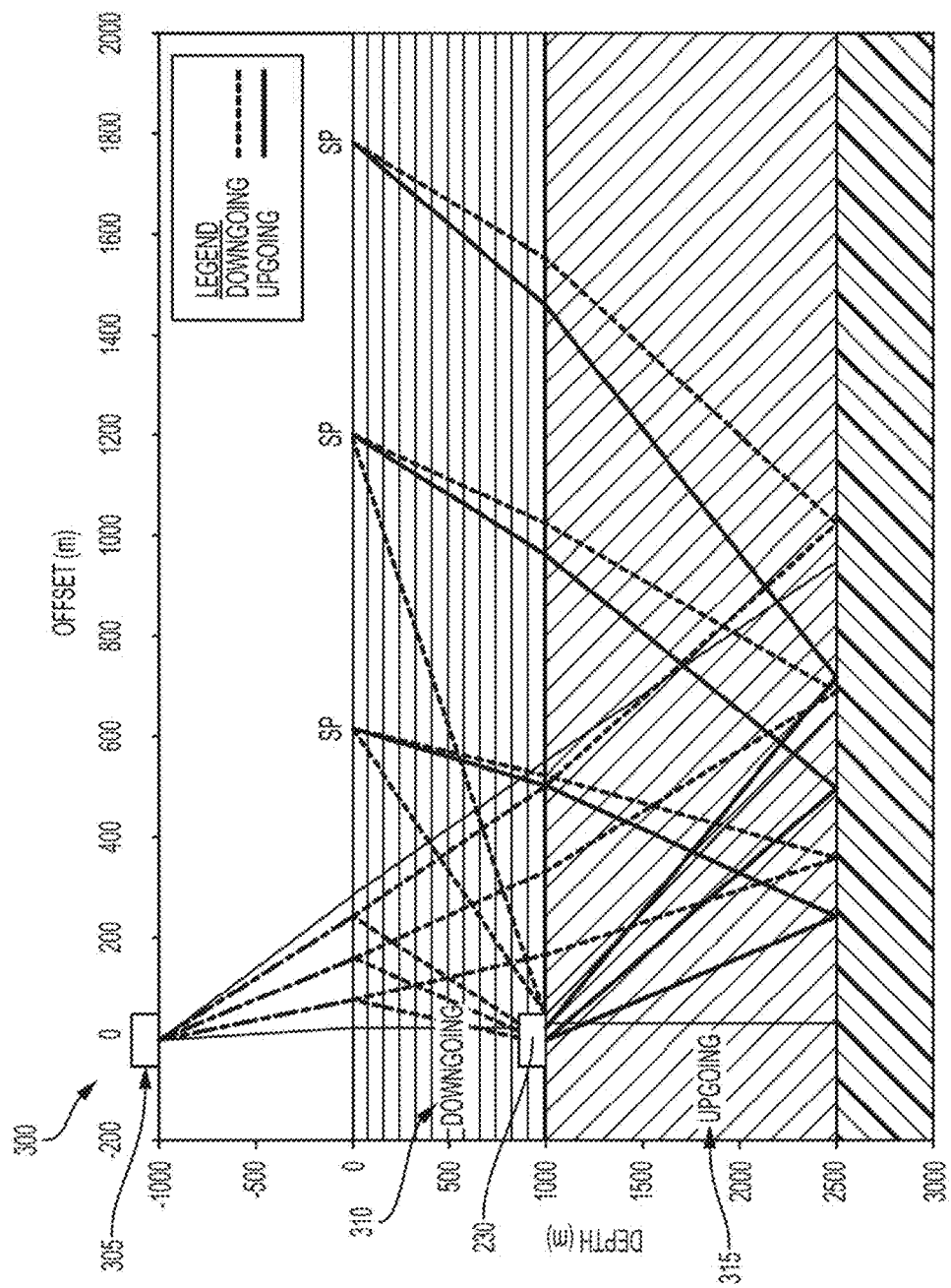
FIG. 3A depicts downgoing and upgoing waves in accordance with an embodiment.

FIG. 3A depicts an illustration 300 showing downgoing 310 and upgoing 315 wavefields in accordance with an embodiment. The illustration 300 shows multiple shot points (SP) 85 on the surface of the aqueous medium, which corresponds to a depth of 0 meters. The shot points 85 can be offset from the seismic device 230 by approximately 600 meters, 1200 meters, and 1800 meters. The data processing system 205 can select data corresponding to the shot point 85 at 600 meters for processing. A seismic data acquisition device 230 can be located on the seabed, for example at a depth of 1000 meters below the surface of the aqueous medium. Upgoing waves 315 refer to seismic energy that can arrive at the seafloor after being reflected off of a subsurface formation (e.g., a formation located at a depth of 2500 meters below the surface of the aqueous medium, or 1500 meters below the seafloor). The waves can refer to seismic energy from an acoustic signal propagated from one or more acoustic sources or shot points 85. A downgoing wave 310 can refer to seismic energy that arrives directly at the seafloor from the shot point 85, or seismic energy that arrives at the seafloor after a near-total (e.g., more than 90%, 80%, 70%, 60% or 50%) internal reflection at the air-water interface (e.g., the surface of the aqueous medium at a depth of 0 meters). The downgoing waves 310 can be projected to a point, such as point 305. The point 305 can indicate a focal point for a projection of the downgoing waves 310 when there is less than total reflection at the air-water interface.

Figure 3B:
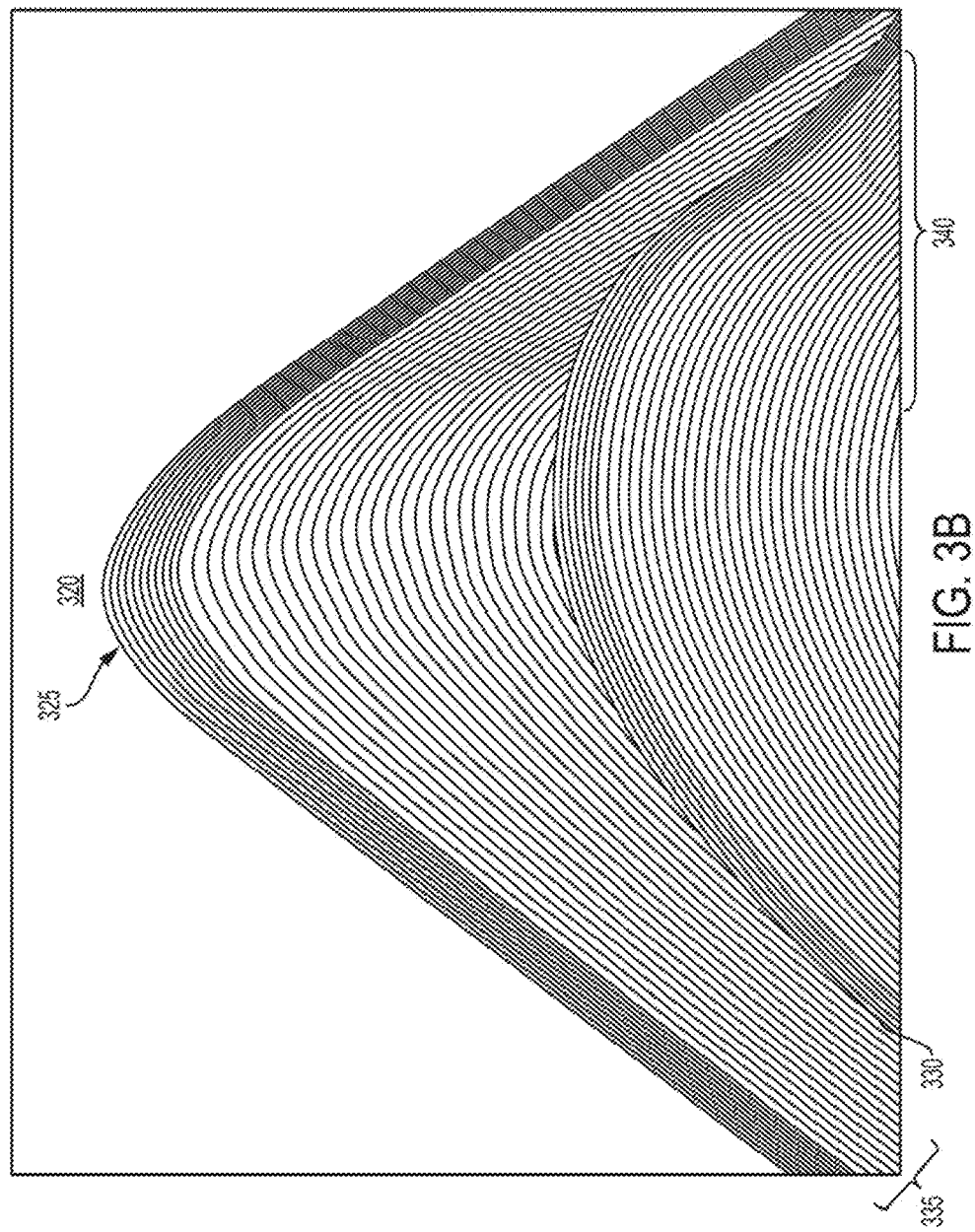
FIG. 3B depicts an image rendered using calibrated seismic data in accordance with an embodiment.

FIG. 3B depicts an image 320 of seismic data in accordance with an embodiment. The image 320 illustrates several curves generated with trace data, including curves 325, 330, 335, and 340. Curve 325 can indicate a direct arrival downgoing wave, such as the direct arrival of seismic energy from an acoustic source shot point 85 to the node 230 as illustrated in FIG. 3A. Curve 330 can indicate a mirror arrival downgoing wave, such as seismic energy from shot point 85 that reflects off of the seafloor at 1000 meters, reflects off of the air-water boundary at 0 meters, and travels to the node 230 on the seafloor at 1000 meters. Due to the multiple reflections, the curve 330 can indicate a mirror reflection at negative 1000 meters, or 1000 meters above the surface of the water. This may not be a real location of the node. The curves 335 that are between the direct arrival curve 325 and the mirror arrival curve 330 can include upgoing waves. In some cases, the curves 335 can indicate only upgoing waves. Upgoing waves 340 can indicate subsurface lithological formations. For example, the seismic energy can travel from the acoustic shot point 85 towards the seafloor at 1000, traverse the seafloor and reflect off of a subsurface lithological formation at a depth of 2500 meters, and travel up towards the node 230 on the seafloor. The geophone of the node 230 can detect the motion caused by the seismic energy that reflects off of the subsurface lithological formation.

The curves 340 that are below curve 330 can indicate downgoing waves. In some cases, the curves 340 may only indicate downgoing waves. For example, the curve 325 can correspond to the downgoing wave that traverse a further distance as they are reflected from a water-air interface before being received at a node. The wavefield separation can be improved, for example, to 24 to 32 dB difference in amplitudes of the up-going and down-going wavefields. The curves 325 and 330 can be generated or rendered using calibrated vertical geophone data.

Figure 4:
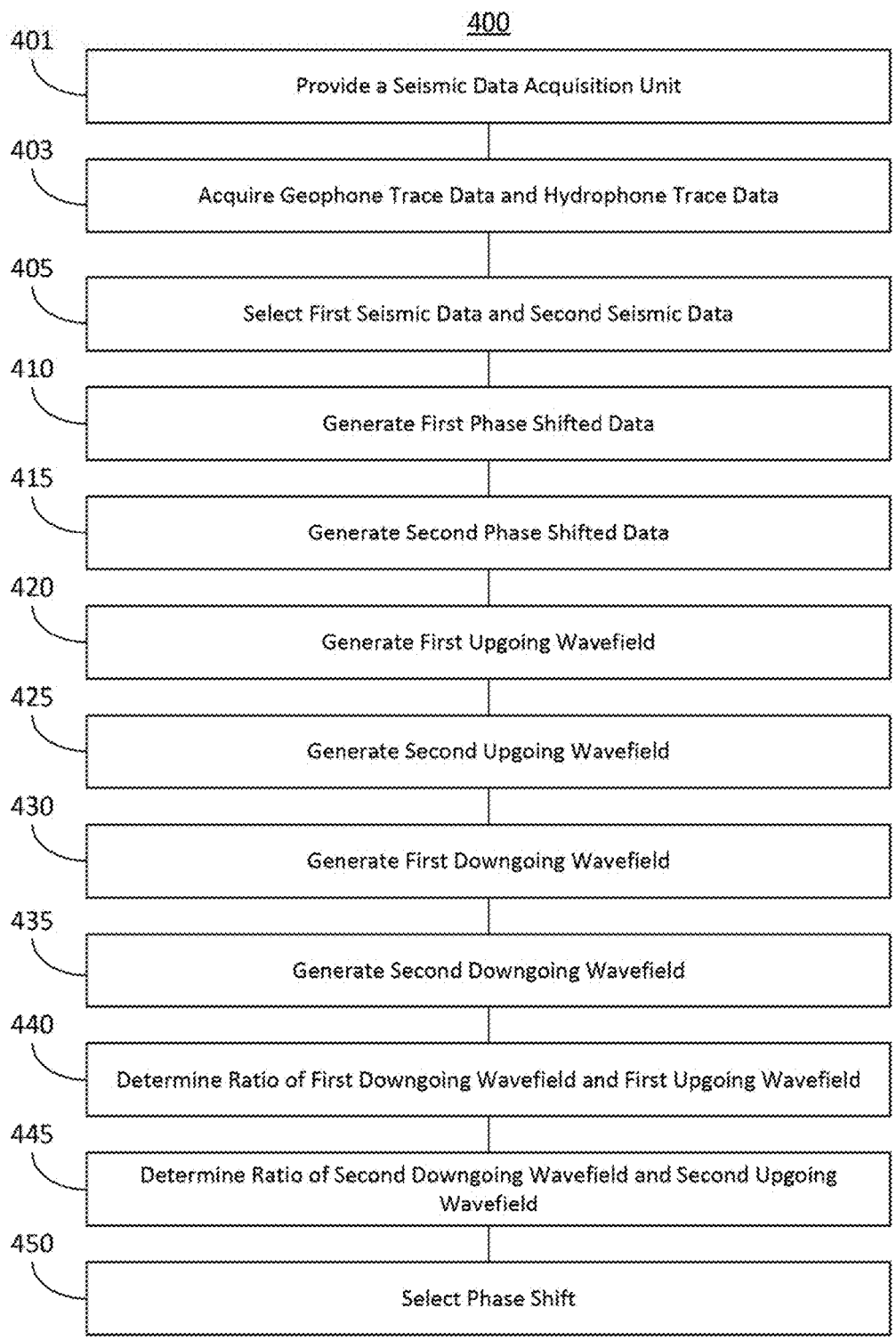
FIG. 4 depicts a method for calibrating a geophone and hydrophone in accordance with an embodiment.

FIG. 4 depicts a method for calibrating a geophone and hydrophone in accordance with an embodiment. The method 400 can be performed by one or more component depicted in FIG. 1, FIG. 2 or FIG. 5, system 200 or system 500, including, e.g., data processing system 205 and seismic data acquisition unit 230, among others. At 401, a seismic data acquisition unit is provide. The seismic data acquisition unit can be deployed or disposed on a seabed. The seismic data acquisition unit can be disposed or placed at a desired position or location on the seabed. The seismic data acquisition unit (or node) can be placed on the seabed in contact with the seabed. The node can be coupled to the seabed. The seismic data acquisition unit can include a geophone and a hydrophone.

At 403, geophone trace data and hydrophone trace data can be acquired. The geophone can acquire geophone trace data responsive to one or more acoustic signals propagated from one or more acoustic sources. The hydrophone can acquire hydrophone trace data responsive to the one or more acoustic signals propagated from the one or more acoustic sources. The geophone and hydrophone can be located near one another. For example, the hydrophone that is paired with the geophone can be the hydrophone in the seismic survey that is nearest to the geophone. The method can account for the differences in geophone attenuation by using the attenuation of a nearby hydrophone as a standard or "exemplar of low or acceptable or desired attenuation" for the particular survey, and then adjust or calibrate the geophone attenuation to emulate the hydrophone attenuation.

At 405, first seismic data and second seismic data can be selected. For example, a data processing system can select first seismic data from the geophone trace data. The first seismic data can be within a frequency band, such as 2 Hz to 100 Hz. The seismic data can be within other frequency bands, such as any frequency band based on the sample rate and the Nyquist frequency. The frequency band can be selected such that the high end corresponds to the Nyquist frequency or is less than the Nyquist frequency. For example, the frequency band can be 0.1 Hz to 200 Hz, 1 Hz to 300 Hz, 2 Hz to 50 Hz, or some other frequency band.

The data processing system can select second seismic data from the hydrophone trace data. The second seismic data can be within the frequency band. The data processing system can obtain the first seismic data from the geophone that acquired the first seismic data. The first seismic data can refer to or include geophone trace data. The data processing system can obtain the first seismic data from a device or memory that obtained the first seismic data from or via the geophone. The data processing system can obtain the second seismic data from a hydrophone that is paired with the geophone. The second seismic data can include or refer to hydrophone trace data. For example, the hydrophone and geophone can be located in the same seismic data acquisition unit, or proximate to the same seismic data acquisition unit, or otherwise associated with the same seismic data acquisition unit or one another. The data processing system can obtain the second seismic data from a device or memory that obtained the second seismic data from or via the hydrophone.

The data processing system can partition the first and second seismic data into one or more frequency bands. The frequency bands can be determined based on a sample rate of the data. For example, the data processing system can identify at least 3 frequency bands, at least 5 frequency bands, at least 10 frequency bands, at least 15 frequency bands, at least 20 frequency bands, or more.

At 410, first phase shift data can be generated. For example, the data processing system can generate the first phase shifted data by applying a first phase shift to the first seismic data. At 415, the data processing system can generate second phase shifted data by applying a second phase shift to the first seismic data. The data processing system can generate additional phase shifted data by applying additional phase shifts to the first seismic data. The series of phase shifts can range across a predetermined range, for example negative 40 degrees to positive 40 degrees. The series of phase shifts can step up in 1 degree increments, for example. The first phase shift can be a phase shift of −40 degrees; the subsequent phase shift can be a phase shift of −39 degrees; and the subsequent phase shift can be −38 degrees, for example.

The data processing system can apply the phase shifts on a per-frequency band basis. For example, the data processing system can generate the first phase shifted data for each frequency band, and generate the second phase shifted data for each frequency band. For example, for a sampling rate of 2 milliseconds, the frequency bands can range from 2 Hz to 100 Hz.

At 420, a first upgoing wavefield can be generated. The data processing system can generate a first upgoing wavefield by summing the first phase shifted seismic data (e.g., geophone trace data with first phase shift) and the second seismic data (e.g., hydrophone trace data). At 425, a second upgoing wavefield can be generated. The data processing system can generate a second upgoing wavefield by summing sum the second phase shifted seismic data and the second seismic data. The data processing system can generate additional upgoing wavefields for additional phase shifts by summing the additional phase shifted geophone trace data with the hydrophone trace data. The data processing system can generate the upgoing wavefields for each frequency band for each phase shift.

At 430, a first going downgoing wavefield can be generated. The data processing system can generate a first downgoing wavefield based on a difference of the first phase shifted seismic data and the second seismic data. At 435, a second downgoing wavefield can be generated. The data processing system can generate a second downgoing wavefield based on a difference of the second phase shifted seismic data and the second seismic data. The data processing system can generate additional downgoing wavefields for additional phase shifts by differencing the additional phase shifted geophone trace data with the hydrophone trace data. The data processing system can generate the downgoing wavefields for each frequency band for each phase shift.

At 440, a ratio of the first downgoing wavefield and the first upgoing wavefield can be determined. The data processing system can determine a first ratio of the first upgoing wavefield and the first downgoing wavefield. At 445, a ratio of the second downgoing wavefield and the second upgoing wavefield can be determined. The data processing system can determine a second ratio of the second upgoing wavefield and the second downgoing wavefield. The data processing system can determine the ratios for each frequency band for each phase shift.

At 450, a phase shift can be selected. The data processing system can select the highest ratio for each frequency band, where the highest ratio corresponds to a phase shift. In the event there are multiple phase shifts that correspond to the highest ratio, the data processing system can select the smallest phase shift, the largest phase shift, or the median phase shift. For example, the data processing system can select the first phase shift based on the first ratio being greater than the second ratio. The data processing system can use the first ratio to produce a calibrated image that compensates for a coupling of the geophone to earth.

The data processing system can use the phase shifts corresponding to the highest ratio for each frequency band to generate a phase operator. The data processing system can use the phase operator to calibrate the geophone, calibrate data acquired by the geophone, or generate an image or other plot using the data acquired by the geophone.

The data processing system can generate a phase operator for each seismic data acquisition unit, or each deployment of each seismic data acquisition unit. At each deployment, the geophone can have a different amount of coupling with the earth or seafloor. Thus, the data processing system can generate a new phase operator for each geophone and each deployment of each geophone. The data processing system can store, in a data structure, the phase operator for each geophone and each deployment. The data processing system can retrieve the stored phase operator to produce calibrate seismic data or an image or plot using calibrated seismic data.

Figure 5:
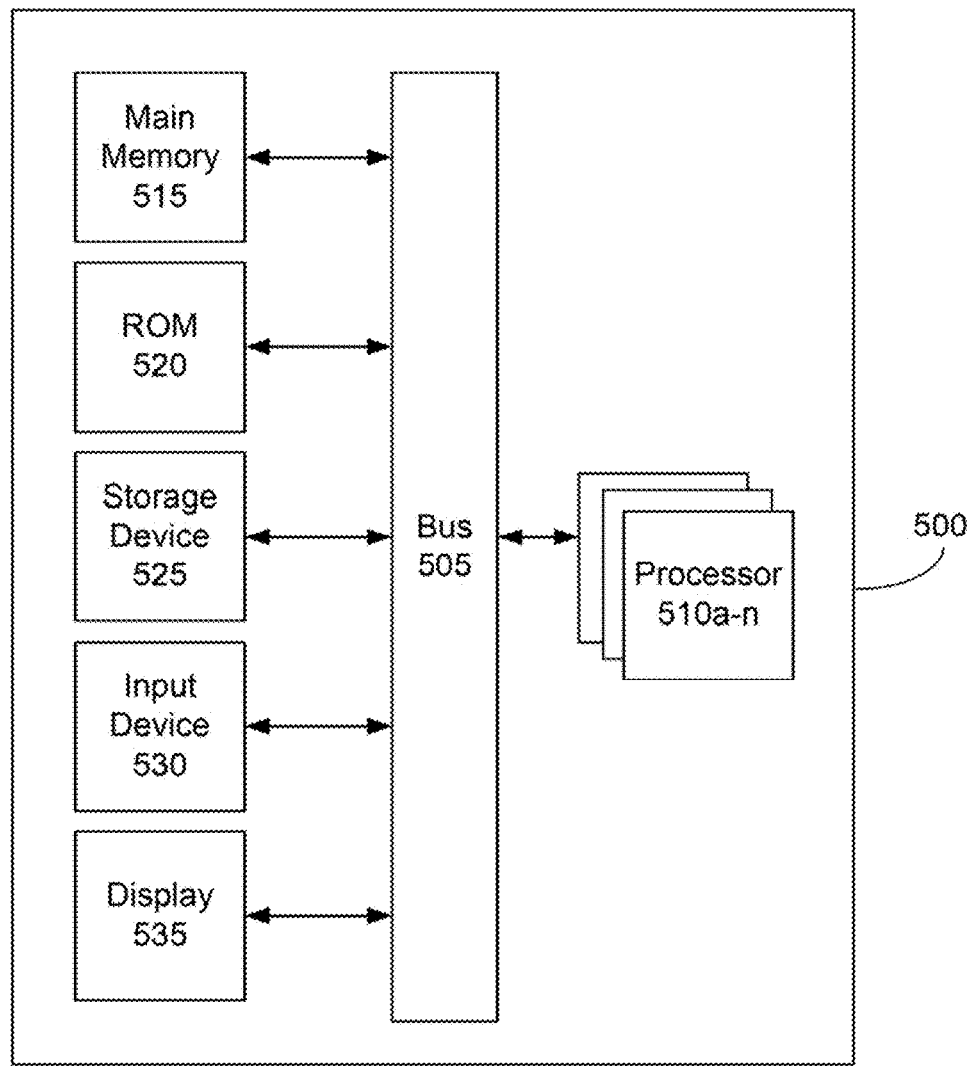
FIG. 5 depicts a block diagram of an architecture for a computing system employed to implement various elements of the system depicted in FIG. 2 and perform the method depicted in FIG. 4.

FIG. 5 is a block diagram of a computer system 500 in accordance with an embodiment. The computer system or computing device 500 can be used to implement one or more component of system 200 or element of method 400. The computing system 500 includes a bus 505 or other communication component for communicating information and a processor 510a-n or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. Main memory 515 can also be used for storing seismic data, binning function data, images, reports, tuning parameters, executable code, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid state device, magnetic disk or optical disk, is coupled to the bus 505 for persistently storing information and instructions.

The computing system 500 may be coupled via the bus 505 to a display 535 or display device, such as a liquid crystal display, or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515.

In some embodiments, hard-wired circuitry may be used in place of or in combination with software instructions to effect illustrative implementations. Thus, embodiments are not limited to any specific combination of hardware circuitry and software.

Although an example computing system has been described in FIG. 5, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Where technical features in the drawings, detailed description or any claim are followed by reference identifiers, the reference signs have been included to increase the intelligibility of the drawings, detailed description, and claims. Accordingly, neither the reference identifiers nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A seismic data acquisition system to perform a seismic survey in a marine environment, comprising:
    a seismic data acquisition unit to dispose on a seabed of the marine environment, the seismic data acquisition unit comprising:
        a geophone to acquire geophone trace data responsive to an acoustic signal propagated from an acoustic source;
        a hydrophone to acquire hydrophone trace data responsive to the acoustic signal propagated from the acoustic source; and
    a data processing system having a calibration component that:
        selects, from the geophone trace data, first seismic data within a first frequency band;
        selects, from the hydrophone trace data, second seismic data within the first frequency band;
        generates first phase shifted seismic data via application of a first phase shift to the first seismic data, and generates second phase shifted seismic data via application of a second phase shift to the first seismic data, the second phase shift different from the first phase shift;
        generates a first upgoing wavefield based on a sum of the first phase shifted seismic data and the second seismic data, and generates a second upgoing wavefield based on a sum of the second phase shifted seismic data and the second seismic data;
        generates a first downgoing wavefield based on a difference of the first phase shifted seismic data and the second seismic data, and generates a second downgoing wavefield based on a difference of the second phase shifted seismic data and the second seismic data;
        determines a first ratio of the first upgoing wavefield and the first downgoing wavefield, and determines a second ratio of the second upgoing wavefield and the second downgoing wavefield; and selects the first phase shift based on the first ratio being greater than the second ratio to produce a calibrated image that compensates for a coupling of the geophone to the seabed.

2. The system of claim 1, comprising:
the geophone configured to detect motion; and
the hydrophone configured to measure a pressure change, the hydrophone being a different type of device than the geophone.

3. The system of claim 1, wherein the geophone detects a vertical component of motion.

4. The system of claim 1, wherein the first seismic data comprises a first trace and the second seismic data comprises a second trace paired with the first trace, the first trace and the second trace having an offset within a threshold.

5. The system of claim 1, comprising the data processing system configured to:
determine an amplitude of the first upgoing wavefield;
determine an amplitude of the first downgoing wavefield;
determine the first ratio as the amplitude of the first downgoing wavefield divided by the amplitude of the first upgoing wavefield;
determine an amplitude of the second upgoing wavefield;
determine an amplitude of the second downgoing wavefield; and
determine the second ratio as the amplitude of the second downgoing wavefield divided by the amplitude of the second upgoing wavefield.

6. The system of claim 1, comprising the data processing system configured to:
partition the first seismic data into a plurality of frequency bands; and
determine the first ratio and the second ratio for a frequency band of the plurality of frequency bands.

7. The system of claim 1, comprising the data processing system configured to:
partition the first seismic data into a plurality of frequency bands;
partition the second seismic data into the plurality of frequency bands;
determine an average amplitude for the first upgoing wavefield for each of the plurality of frequency bands;
determine an average amplitude for the first downgoing wavefield for each of the plurality of frequency bands;
determine a third ratio for each of the plurality of frequency bands based on the average amplitude for the first downgoing wavefield for each of the plurality of frequency bands divided by the average amplitude for the first upgoing wavefield for each of the plurality of frequency bands;
determine an average amplitude for the second upgoing wavefield for each of the plurality of frequency bands;
determine an average amplitude for the second downgoing wavefield for each of the plurality of frequency bands;
determine a fourth ratio for each of the plurality of frequency bands based on the average amplitude for the second downgoing wavefield for each of the plurality of frequency bands divided by the average amplitude for the second upgoing wavefield for each of the plurality of frequency bands;
select, to produce the calibrated image, the first phase shift for a first frequency band of the plurality of frequency bands based on the third ratio for the first frequency band being greater than the fourth ratio for the first frequency band; and select, to produce the calibrated image, the second phase shift for a second frequency band of the plurality of frequency bands based on the fourth ratio for the second frequency band being greater than the third ratio for the second frequency band.

8. The system of claim 1, comprising the data processing system configured to:
partition the first seismic data into a plurality of frequency bands;
partition the second seismic data into the plurality of frequency bands;
generate a phase operator based on a phase shift corresponding to a highest ratio for each of the plurality of frequency bands; and
use the phase operator to produce the calibrated image.

9. The system of claim 8, wherein the plurality of frequency bands comprises at least three different frequency bands.

10. The system of claim 1, comprising the data processing system configured to:
calibrate the geophone based on the first phase shift selected based on the first ratio being greater than the second ratio.

11. The system of claim 1, comprising the data processing system configured to:
combine the first phase shift with a predetermined system response operator to produce the calibrated image.

12. The system of claim 1, comprising the data processing system configured to:
calibrate the geophone and the hydrophone by applying the first phase shift to the first seismic data.

13. A method of performing a seismic survey in a marine environment using a seismic data acquisition system, comprising:
providing a seismic data acquisition system disposed on a seabed of the marine environment;
acquiring, by a geophone of the seismic data acquisition system, geophone trace data responsive to an acoustic signal propagated from an acoustic source;
acquiring, by a hydrophone of the seismic data acquisition system, hydrophone trace data responsive to the acoustic signal propagated from the acoustic source;
selecting, by a calibration component executed by one or more processors of a data processing system, from the geophone trace data, first seismic data within a first frequency band;
selecting, by the calibration component, from the hydrophone trace data, second seismic data within the first frequency band;
generating, by the calibration component, first phase shifted seismic data by applying a first phase shift to the first seismic data,
generating, by the calibration component, second phase shifted seismic data by applying a second phase shift to the first seismic data, the second phase shift different from the first phase shift;
generating, by the calibration component, a first upgoing wavefield based on a sum of the first phase shifted seismic data and the second seismic data;
generating, by the calibration component, a second upgoing wavefield based on a sum of the second phase shifted seismic data and the second seismic data;
generating, by the calibration component, a first downgoing wavefield based on a difference of the first phase shifted seismic data and the second seismic data;

generating, by the calibration component, a second downgoing wavefield based on a difference of the second phase shifted seismic data and the second seismic data;

determining, by the calibration component, a first ratio of the first upgoing wavefield and the first downgoing wavefield;

determining, by the calibration component, a second ratio of the second upgoing wavefield and the second downgoing wavefield; and selecting, by the calibration component, the first phase shift based on the first ratio being greater than the second ratio to produce a calibrated image that compensates for a coupling of the geophone to earth.

14. The method of claim 13, comprising:
detecting, by the geophone, motion; and
measuring, by the hydrophone, a pressure change, the hydrophone being a different type of device than the geophone.

15. The method of claim 13, comprising:
detecting, by the geophone, a vertical component of motion.

16. The method of claim 13, comprising:
obtaining, by the calibration component, the first seismic data comprising a first trace and the second seismic data comprises a second trace paired with the first trace, the first trace and the second trace having an offset within a threshold.

17. The method of claim 13, comprising:
determining, by the calibration component, an amplitude of the first upgoing wavefield;
determining, by the calibration component, an amplitude of the first downgoing wavefield;
determining, by the calibration component, the first ratio as the amplitude of the first downgoing wavefield divided by the amplitude of the first upgoing wavefield;
determining, by the calibration component, an amplitude of the second upgoing wavefield;
determining, by the calibration component, an amplitude of the second downgoing wavefield; and
determining, by the calibration component, the second ratio as the amplitude of the second downgoing wavefield divided by the amplitude of the second upgoing wavefield.

18. The method of claim 13, comprising:
partitioning, by the calibration component, the first seismic data into a plurality of frequency bands; and
determining, by the calibration component, the first ratio and the second ratio for a frequency band of the plurality of frequency bands.

19. The method of claim 13, comprising:
partitioning, by the calibration component, the first seismic data into a plurality of frequency bands;
partitioning, by the calibration component, the second seismic data into the plurality of frequency bands;
determining, by the calibration component, an average amplitude for the first upgoing wavefield for each of the plurality of frequency bands;
determining, by the calibration component, an average amplitude for the first downgoing wavefield for each of the plurality of frequency bands;
determining, by the calibration component, a third ratio for each of the plurality of frequency bands based on the average amplitude for the first downgoing wavefield for each of the plurality of frequency bands divided by the average amplitude for the first upgoing wavefield for each of the plurality of frequency bands;
determining, by the calibration component, an average amplitude for the second upgoing wavefield for each of the plurality of frequency bands;
determining, by the calibration component, an average amplitude for the second downgoing wavefield for each of the plurality of frequency bands;
determining, by the calibration component, a fourth ratio for each of the plurality of frequency bands based on the average amplitude for the second downgoing wavefield for each of the plurality of frequency bands divided by the average amplitude for the second upgoing wavefield for each of the plurality of frequency bands;
selecting, by the calibration component to produce the calibrated image, the first phase shift for a first frequency band of the plurality of frequency bands based on the third ratio for the first frequency band being greater than the fourth ratio for the first frequency band; and
select, to produce the calibrated image, the second phase shift for a second frequency band of the plurality of frequency bands based on the fourth ratio for the second frequency band being greater than the third ratio for the second frequency band.

20. The method of claim 13, comprising:
partitioning, by the calibration component, the first seismic data into a plurality of frequency bands;
partitioning, by the calibration component, the second seismic data into the plurality of frequency bands;
generating, by the calibration component, a phase operator based on a phase shift corresponding to a highest ratio for each of the plurality of frequency bands; and
using, by the calibration component, the phase operator to produce the calibrated image.

* * * * *